(12) United States Patent
Jensen et al.

(10) Patent No.: US 6,603,845 B2
(45) Date of Patent: Aug. 5, 2003

(54) PHONE DEVICE DIRECTORY ENTRY ADDITION

(75) Inventors: C. Troy Jensen, Caldwell, ID (US); David M. Payne, Meridian, ID (US); Tim M. Hoberock, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 238 days.

(21) Appl. No.: 09/880,538

(22) Filed: Jun. 13, 2001

(65) Prior Publication Data

US 2002/0191752 A1 Dec. 19, 2002

(51) Int. Cl.[7] .................................. H04M 1/56
(52) U.S. Cl. ........................ 379/142.01; 379/142.04; 379/142.06; 379/142.12
(58) Field of Search .................... 379/29.01, 29.06, 379/142.01, 142.04, 142.06, 142.07, 142.12, 142.13, 142.14, 142.15, 142.17, 93.01, 211.02; 455/415

(56) References Cited

U.S. PATENT DOCUMENTS

| | | | | |
|---|---|---|---|---|
| 5,734,706 A | * | 3/1998 | Windsor et al. | 379/142.01 |
| 5,790,652 A | * | 8/1998 | Gulley et al. | 379/368 |
| 6,324,270 B1 | * | 11/2001 | Lund | 379/142.14 |
| 6,463,138 B1 | * | 10/2002 | Sherwood et al. | 379/142.14 |
| 6,490,447 B2 | * | 12/2002 | Biedermann et al. | 455/426 |

* cited by examiner

*Primary Examiner*—Sinh Tran
*Assistant Examiner*—Barry W. Taylor

(57) ABSTRACT

The addition of directory entries into phone devices, such as telephones, is disclosed. The phone devices are coupled to common phone line wiring, and have caller ID, caller log, and directory storage capabilities. Phone calls are simulated to the phone devices. The phone calls correspond to directory entries, such as those that the user wishes to add to the phone devices. Each phone call has caller ID information reflecting a corresponding directory entry. After the phone calls for the directory entries have been simulated, each phone device has a caller log of the caller ID information of the simulated phone calls for transfer into a directory storage thereof.

20 Claims, 11 Drawing Sheets

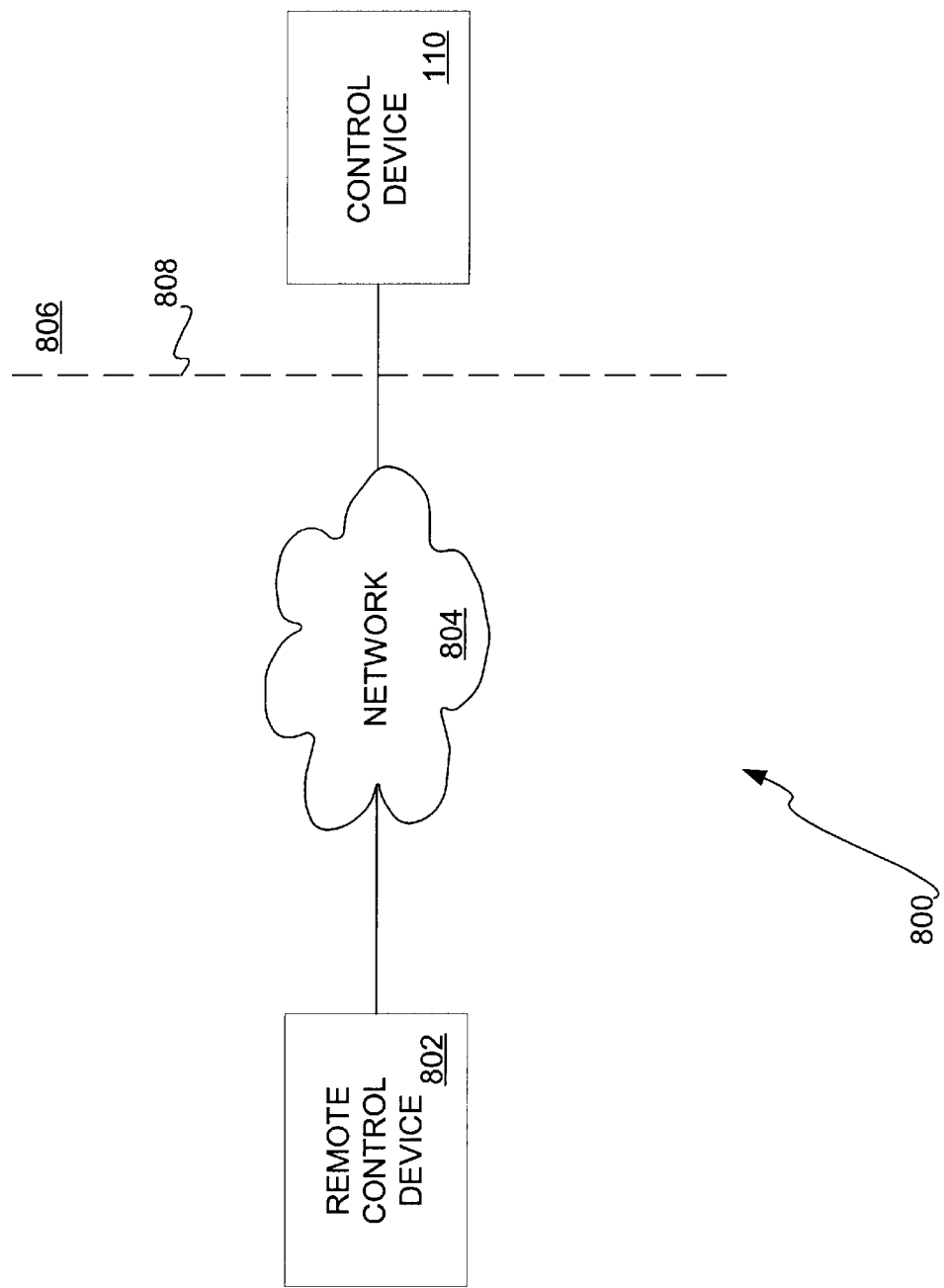

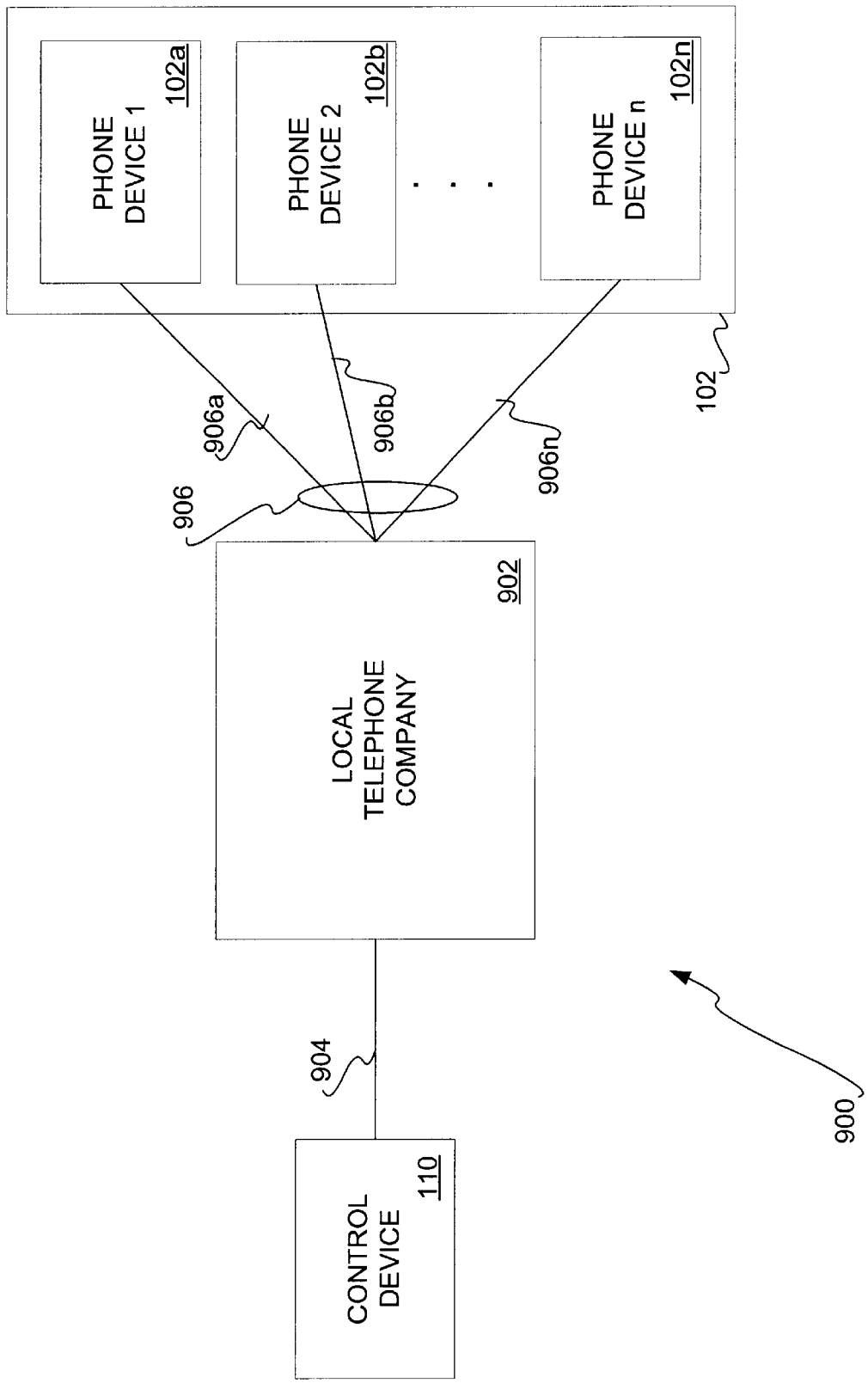

PHONE DEVICE DIRECTORY ENTRY ADDITION

FIELD OF THE INVENTION

This invention relates generally to phone devices, such as telephones, and more particularly to adding directory entries to such phone devices that have directory storage capabilities.

BACKGROUND OF THE INVENTION

In the past, most residences had only one or two telephones. These phones were typically unintelligent, in that they were capable only of receiving and sending phone calls, and nothing more. Phones in general are connected to common phone line wiring throughout a given entity, such as a house, an apartment, an office, and so on. The common phone line wiring is in turn connected to an incoming phone line from the local telephone company, on which phone calls are actually made.

More recently, telephone technology has become more advanced, resulting in phones that are more complex. For instance, many phones are capable of displaying caller ID information, where caller ID service has previously been subscribed to from the local telephone company. Caller ID enables caller ID-capable phones to display the phone number, and frequently the name, of the person who is currently calling. The caller ID information is received while the phone is ringing, such that the phone decodes and displays the information. This lets the user know who is calling before answering the phone. Most, but not all, phone calls will have corresponding caller ID information. Many caller ID-capable phones have a corresponding caller log capability, which saves the caller ID information of a number of the most recent phone calls for later review by the user.

Many phones also have directory storage capability. This means that the user of the phone can enter in the names and phone numbers of people that he or she frequently calls into a directory storage. A name and phone number pair is referred to as a directory entry. Different types and brands of phones may refer to the directory storage by other names. When the user wishes to call someone for whom a directory entry has been previously entered, the user simply selects the name on the phone to dial that person's number. This is convenient, because the user does not have to have the person's phone number memorized, or have to look up the number in an address or phone book.

However, due to the reduced keypad nature of telephone devices, where most phones do not have a complete set of alphanumeric keys as typewriters and computer keyboards do, entering in the names and phone numbers of the people a user frequently calls can be quite tedious. For instance, the user may have to employ what is known as a multiple-tap approach to enter in letters. In this approach, the user presses a corresponding number on the phone's keypad one-to-three times to enter a desired letter. For example, the five key corresponds to the letters J, K, and L, such that the user presses this key once to enter the letter J, twice to enter the letter K, and three times to enter the letter L.

To overcome this difficulty, phones that have caller ID, caller log, and directory storage capabilities may allow users to transfer caller ID information from their caller logs into their directory storages. When someone calls, his or her caller ID information is stored in the caller log. The user of the phone can then transfer this information from the caller log into the directory storage, where it is indefinitely stored. The downside to this approach is that until someone calls, his or her caller ID information cannot be transferred into the directory storage. This means that the user is still likely to have to manually enter the names and phone numbers of at least some people, or wait until everyone has called, before the directory storage stores all the names and numbers desired by the user.

Another difficulty is that, with the decreasing cost of phones, many users have two, three, or more phones in their homes or offices. The user thus has to repeat the name and phone number entry process, and/or the caller ID information transfer process, on each of the phones. This is because most phones are discrete units, in that they have no way of receiving information from other phones or from other devices, such as computers, and so on. When the user wishes to have a large number of directory entries stored in each phone, entry and/or transfer becomes even more tedious and time-consuming.

To overcome this difficulty, some multi-phone systems have been created that allow users to transfer the contents of the directory storage of one phone to the directory storages of all the other phones in the system. For example, the GIGASET phone system, available from Siemens AG, of Munich, Germany, has this capability. The individual cordless handsets of the system can wirelessly communicate with one another through the system's base station. Once the user has entered or transferred all the desired directory entries into the directory storage of one handset, he or she can then send the entries to the directory storages of the other handsets, on an individual basis. The downside to this approach is that it is proprietary, so nearly all other phones are not compatible with the system and cannot receive the sent directory storages.

Therefore, for these and other reasons, there is a need for the present invention.

SUMMARY OF THE INVENTION

The invention relates to adding directory entries to phone devices such as telephones. The phone devices are coupled to common phone line wiring, and have caller ID, caller log, and directory storage capabilities. A system of one embodiment includes a phone simulator and a control device, the latter which may be a phone device itself, a computer, or another type of device. The phone simulator can be part of the control device itself. The phone simulator is capable of simulating phone calls with caller ID information on the common phone line wiring to the phone devices. The control device simulates a number of phone calls through the phone simulator to the phone devices. The phone calls correspond to directory entries, such as those that the user wishes to add to the phone devices. Each phone call has caller ID information reflecting a corresponding directory entry. After the phone calls have been simulated, each phone device has a caller log of the caller ID information of the simulated phone calls for transfer into a directory storage.

A computer-readable medium of another embodiment of the invention has instructions stored thereon to cause a device to perform a method for each of a number of directory entries to be added into the phone device directory storages. The method first converts a directory entry to caller ID information that reflects the directory entry. The method simulates a phone call having the caller ID information to the phone devices. After simulation of the phone calls, each phone device has a caller log of the caller ID information of the simulated phone calls for transfer into a directory storage.

A method of still another embodiment of the invention first asserts at least temporary exclusive control of the common phone wiring to which the phone devices are connected. The method simulates phone calls over the common phone line wiring. The phone calls correspond to directory entries, such as those that the user wishes to add to the phone devices. Each phone call has caller ID information reflecting a corresponding directory entry. After the phone calls have been simulated, each phone device has a caller log of the caller ID information of the simulated phone calls for transfer into a directory storage.

At least some embodiments of the invention provide for advantages not found within the prior art. Where the control device is a computer, the user can easily enter in the names and phone numbers of the directory entries to be added to the phone devices by using a standard computer keyboard. The user does not have to resort to the usually tedious multiple-tap approach to enter in names and phone numbers. Furthermore, the user does not have to wait for everyone to call before the directory storage of each phone device stores all the names and numbers that the user desires. This is because calls from everyone are simulated. At least some embodiments are also compatible with any existing phone that has caller ID, caller log, and directory storage capabilities, since the directory entries are sent to the phones through the common phone line wiring.

Still other advantages, embodiments, and aspect of the invention will become apparent by reading the detailed description that follows, and by referring to the accompanying drawings.

BRIEF DESCRIPTION OF THE DRAWINGS

FIG. 8 is a diagram of a system in which directory entries are entered in a remote control device and sent to another control device over a network, according to one embodiment of the invention.

FIG. 9 is a diagram of a system in which phone calls corresponding to directory entries are simulated by the local telephone company or other entity, according to one embodiment of the invention.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

System Topologies

Figure 1:
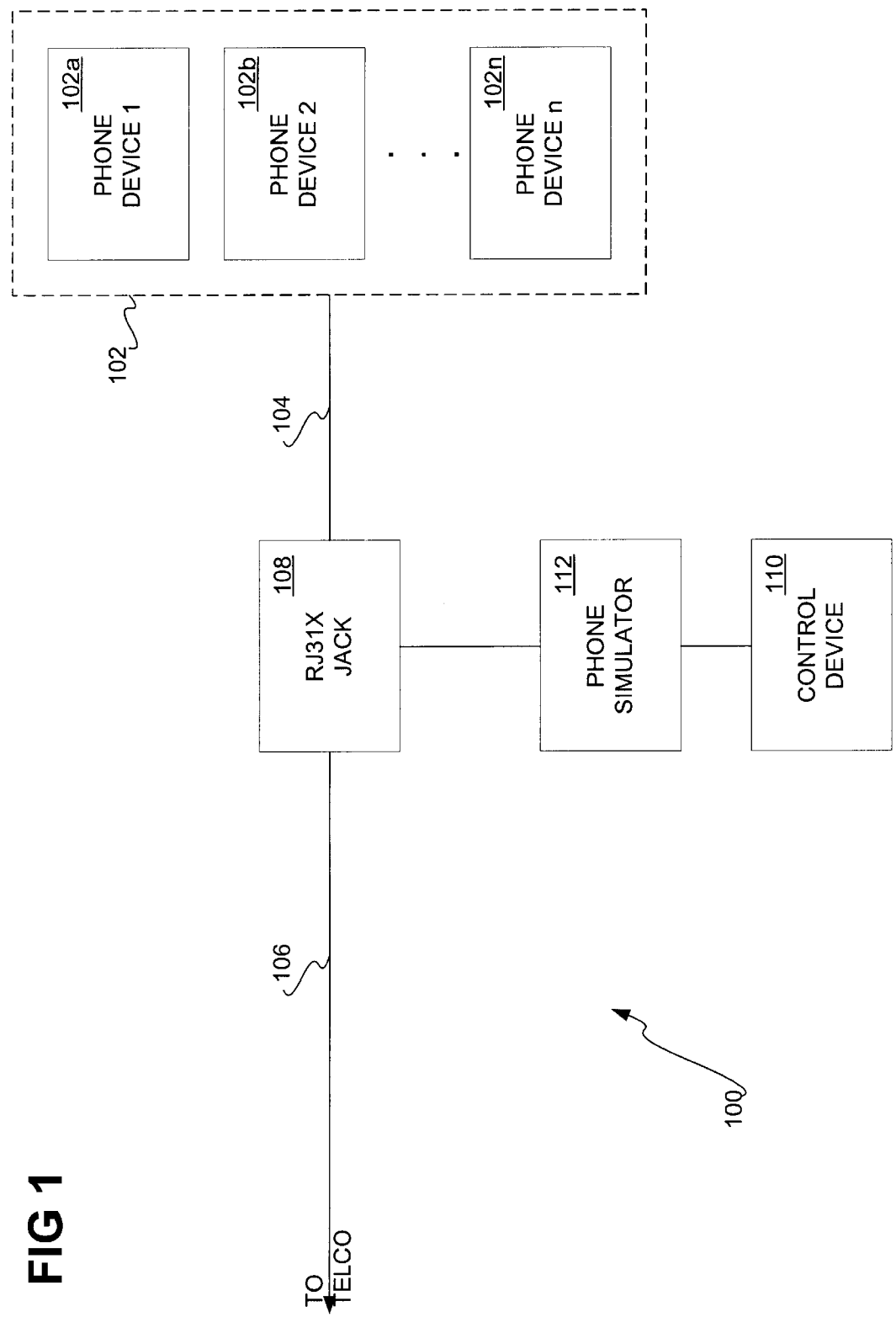
FIG. 1 is a diagram of a system having an RJ31X jack to allow seizure of common phone line wiring from an incoming phone line, according to one embodiment of the invention.

FIG. 1 is a diagram of a system 100 according to one embodiment of the invention. The phone devices 102 specifically include the phone devices 102a, 102b, . . . , 102n. Each of the phone devices 102 can be a standard telephone, or another type of a phone device. Each of the phone devices 102 has caller ID, caller log, and directory storage capabilities. The caller ID capability enables a phone device to decode and display the accompanying caller ID information of a phone call. The caller ID information typically includes the phone number, and frequently the name, of the current caller. The caller log capability enables a phone device to store the caller ID information of a number of the most recent phone calls received. Finally, the directory storage capability enables a phone device to store indefinitely a number of directory entries entered by the user and/or transferred from the caller log. Each directory entry includes a name and phone number pair. The user is able to make a call to someone for whom a directory entry is stored in the directory storage typically by selecting his or her name.

The phone devices 102 are coupled to common phone line wiring 104. The common phone line wiring 104 is defined as the internal telephone wiring of an entity, such as a house, an office, an apartment, a condominium, or another type of building or structure. The phone devices 102 typically connect to the phone line wiring 104 by RJ31 plugs of the former connecting to RJ31 jacks of the latter. The common phone line wiring 104 is coupled to an incoming phone line 106 from the local telephone company. In this case, the phone line wiring 104 is coupled to the incoming phone line 106 through an in-between RJ31X jack 108. The phone devices 102, therefore, normally make and receive phone calls on the incoming phone line 106 over the phone line wiring 104.

A control device 110 is connected to a phone simulator 112, which is itself connected to the RJ31X jack 108. The control device 110 may be a computer, a phone device itself, or another type of device. The phone simulator 112 can alternatively be part of the control device 110, instead of a separate device as shown in FIG. 1. The phone simulator 112 simulates real-world phone calls, including dial tone, rings, and caller ID information. The phone simulator 112 is used in embodiments of the invention to simulate phone calls having caller ID information. The simulator 112 may first simulate a dial tone, for instance, and then rings of a phone call interspersed with caller ID information. Examples of phone simulators that may be amenable to modification for implementation in embodiments of the invention include those available from the Black Box Corp., of Lawrence, Pa., Viking Electronics, Inc., of Hudson, Wis., the Digital Products Co., of Folsom, Calif., and the Teltone Corp., of Bothell, Wash.

The system 100 of FIG. 1 works as follows. The user enters in directory entries that he or she wishes to add to the directory storages of the phone devices 102 at the control device 110. Where the control device 110 is a computer, for instance, the user is able to perform entry of the directory entries using a standard computer keyboard. The control device 110 then simulates phones calls corresponding to the directory entries, through the phone simulator 112, to the phone devices 102. Each phone call has caller ID information reflecting a corresponding directory entry.

The coupling of the phone simulator 112 to the RJ31X jack 108 enables the simulator 112 to seize the common phone line wiring 104 from the incoming telephone line 106. Seizure in this case means that the incoming telephone line 106 is temporarily disconnected from the phone line wiring 104, such that the phone simulator 112 has exclusive control of the wiring 104. Seizure of the phone line is usually necessary so that the simulator 112 does not compete with the incoming phone line 106 for control of the line wiring 104.

After the phone calls have been simulated by the control device 110 through the phone simulator 112 to the phone devices 102, each of the phone devices 102 has a caller log of the caller ID information of each of the phone calls simulated. Phone call simulation means that the phone calls appear real to the phone devices 102, as if, for example, they arrived on the incoming phone line 106. However, in actuality, the phone calls are not real, since they are not generated by a caller on a phone connected to a different incoming phone line, transmitted over a phone network, and so on. That is, the simulated phone calls cannot be answered in the sense that there is not a caller at the end of the line, as in an actual phone call.

As a result of the simulation of the phone calls, the caller log of each of the phone devices 102 includes caller ID information for all the directory entries previously entered by the user at the control device 110. The user then simply transfers the contents of the caller log of each of the phone devices 102, or, more specifically, the caller ID information of the caller log corresponding to the phone calls simulated by the control device 110, to the directory storage of the phone device. In this way, the system 100 enables the user to add desired directory entries to the directory storages of the phone devices 102.

Figure 2:
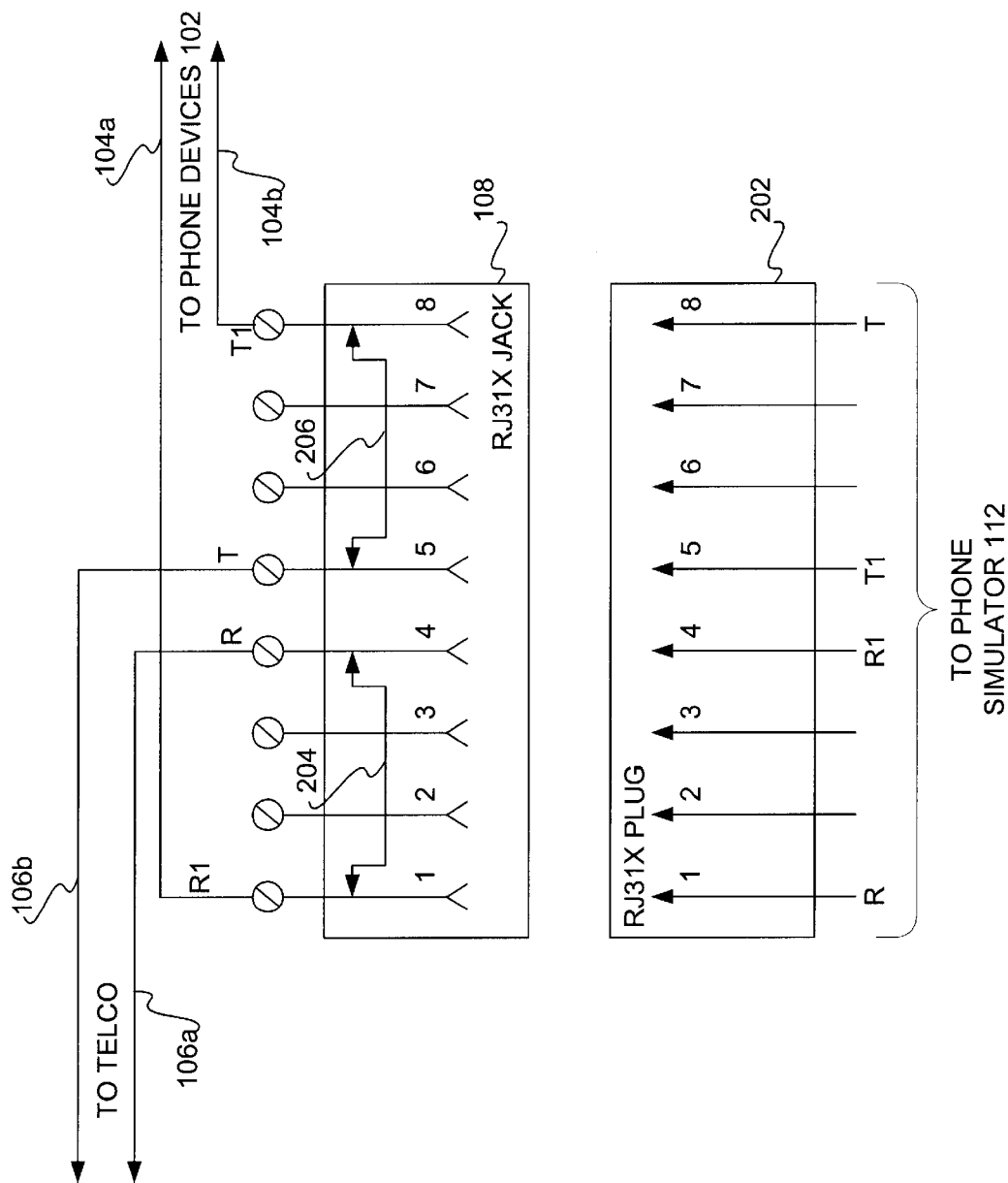
FIG. 2 is a diagram showing how the RJ31X jack of FIG. 1 is connected to the incoming phone line, the common phone line wiring, and an RJ31X plug of a phone simulator.

FIG. 2 is a diagram showing in more detail how the RJ31X jack 108 connects to the common phone line wiring 104, to the incoming phone line 106, and to an RJ31X plug 202 coupled to the phone simulator 112. The line wiring 104 specifically is made up of what is referred to as a ring line 104a and a tip line 104b, whereas the phone line 106 is made up of also what is referred to as a ring line 106a and a tip line 106b. The RJ31X jack is a smaller version of a standard RJ31 jack, and was originally intended for connecting alarm systems to common phone line wiring and incoming phone lines such that the systems were able to seize control of the incoming phone lines when necessary. This solution is considered better than just connecting the alarm systems to standard RJ31 jacks. This is because RJ31X jacks allow the alarm systems to always gain access to the incoming phone lines, instead of having to compete with other phone devices that may be in the midst of phone calls on the incoming phone lines.

As used in the context of at least some embodiments of the invention, however, the RJ31X jack 108 enables the phone simulator 112 to seize the common phone line wiring 104 from the incoming phone line 106, which is opposite to the standard use of an RJ31X jack. This is accomplished by reversing the connection of the common phone line wiring 104 and the incoming phone line 106 when the RJ31X jack 108 is connected between them. Therefore, the ring line 104a and the tip line 104b of the common phone line wiring 104 are connected to pins 1 and 8, respectively, of the RJ31X jack 108, whereas the ring line 106a and the tip line 106b of the incoming phone line 106 are connected to pins 4 and 5, respectively, of the RJ31X jack 108.

Shunts 204 and 206 of the RJ31X jack 108 actually enable the seizure of the common phone line wiring 104 from the incoming phone line 106. The shunt 204 is connected between pins 1 and 4 of the RJ31X jack 108, and hence between the ring lines 104a and 106a of the line wiring 104 and the phone line 106, respectively. Similarly, the shunt 206 is connected between pins 5 and 8 of the RJ31X jack 108, and hence between the tip lines 104b and 106b of the line wiring 104 and the phone line 106, respectively. When the phone simulator 112 simulates a dial tone and a following phone call through the RJ31X plug 202 inserted in the RJ31X jack 108, the shunts 204 and 206 act to automatically cut off the incoming phone line 106 from the phone line wiring 104. In this way, the phone simulator 112 has exclusive control of the phone line wiring 104 via seizure of the wiring through the RJ31X jack 108.

Figure 3:
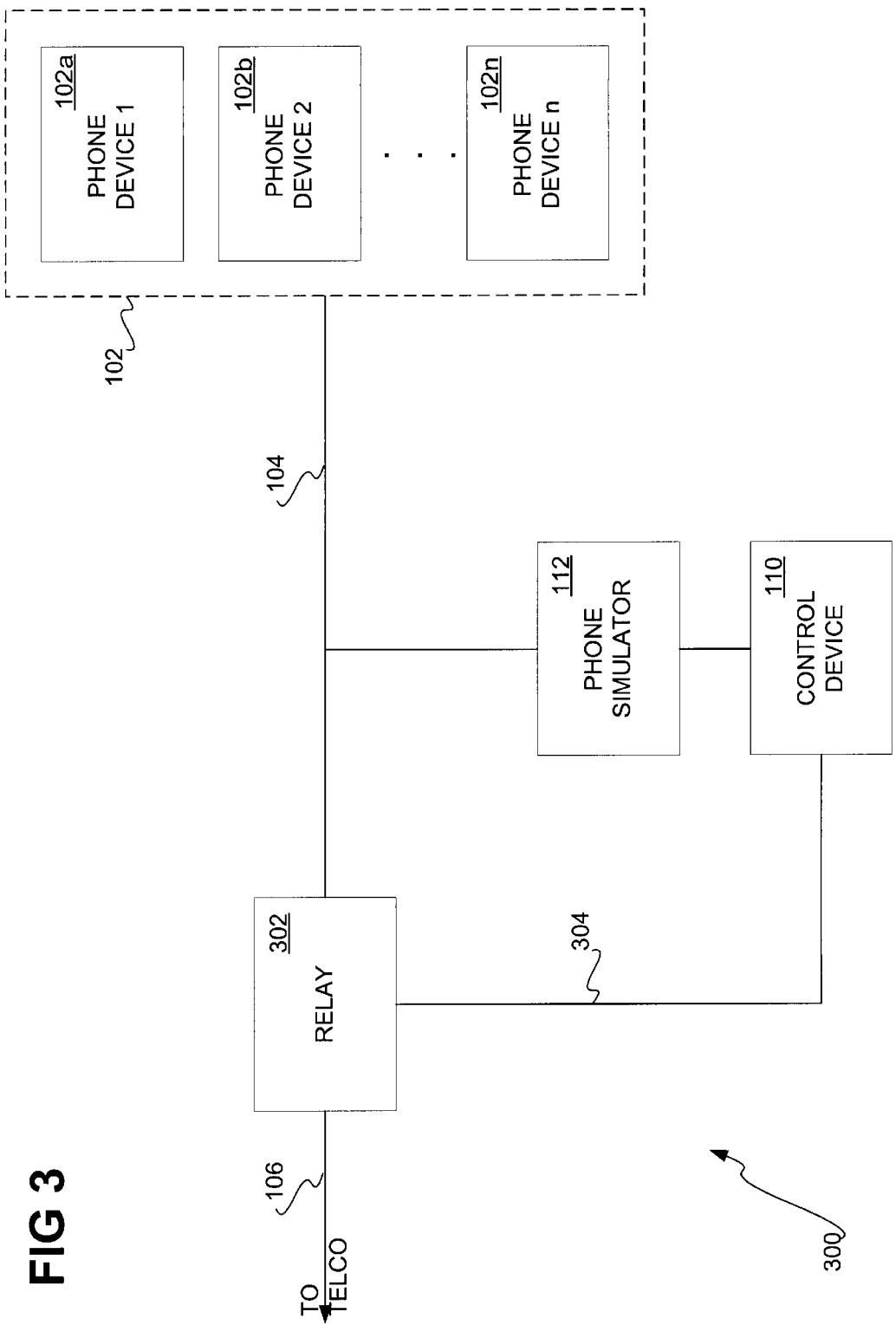
FIG. 3 is a diagram of a system having a relay to allow seizure of common phone line wiring from an incoming phone line, according to one embodiment of the invention.

FIG. 3 is a diagram of a system 300 according to another embodiment of the invention. The system 300 varies from the system 100 of FIG. 1 in that a relay 302 has replaced the RJ31X jack 108. The phone simulator 112 connects to the common phone line wiring 104 in the system 300, such as by an RJ31 plug plugging into an RJ31 jack of the line wiring 104. The control device 110 is connected to the relay 302 through a control line 304. The relay 302 is such that it normally allows connection of the common phone line wiring 104 to the incoming phone line 106. However, when the control device 110 asserts the control line 304, the incoming phone line 106 is disconnected from the line wiring 104, such that the control device 110 has at least temporary exclusive control over the common phone line wiring 104. That is, the relay 302, through the control line 304, allows the control device 110 to seize the common phone line wiring 104.

The system 300 of FIG. 3 works as follows. As before, the user enters in directory entries that he or she wishes to add to the directory storages of the phone devices 102 at the control device 110. The control device 110 then asserts the control line 304 to cause the relay 302 to disconnect the incoming phone line 106 from the common phone line wiring 104. The control device 110 next simulates the phone calls corresponding to the directory entries, through the phone simulator 112, to the phone devices 102. Each phone call has caller ID information reflecting a corresponding directory entry. Once all the phone calls have been simulated, the control device 110 releases the control line 304, such that the relay 302 again connects the incoming phone line 106 to the common phone line wiring 104.

Therefore, as before, after the phone calls have been simulated by the control device 110 through the phone simulator 112 to the phone devices 102, each of the phone devices 102 has a caller log of the caller ID information of each of the phone calls simulated. The caller log of each of the phone devices 102 includes caller ID information for all the directory entries previously entered by the user at the control device 110. The user simply transfers the contents of the caller log of each of the phone devices 102 to the directory storage of the phone device. In this way, the system 300 enables the user to add desired directory entries to the directory storages of the phone devices 102.

Figure 4:
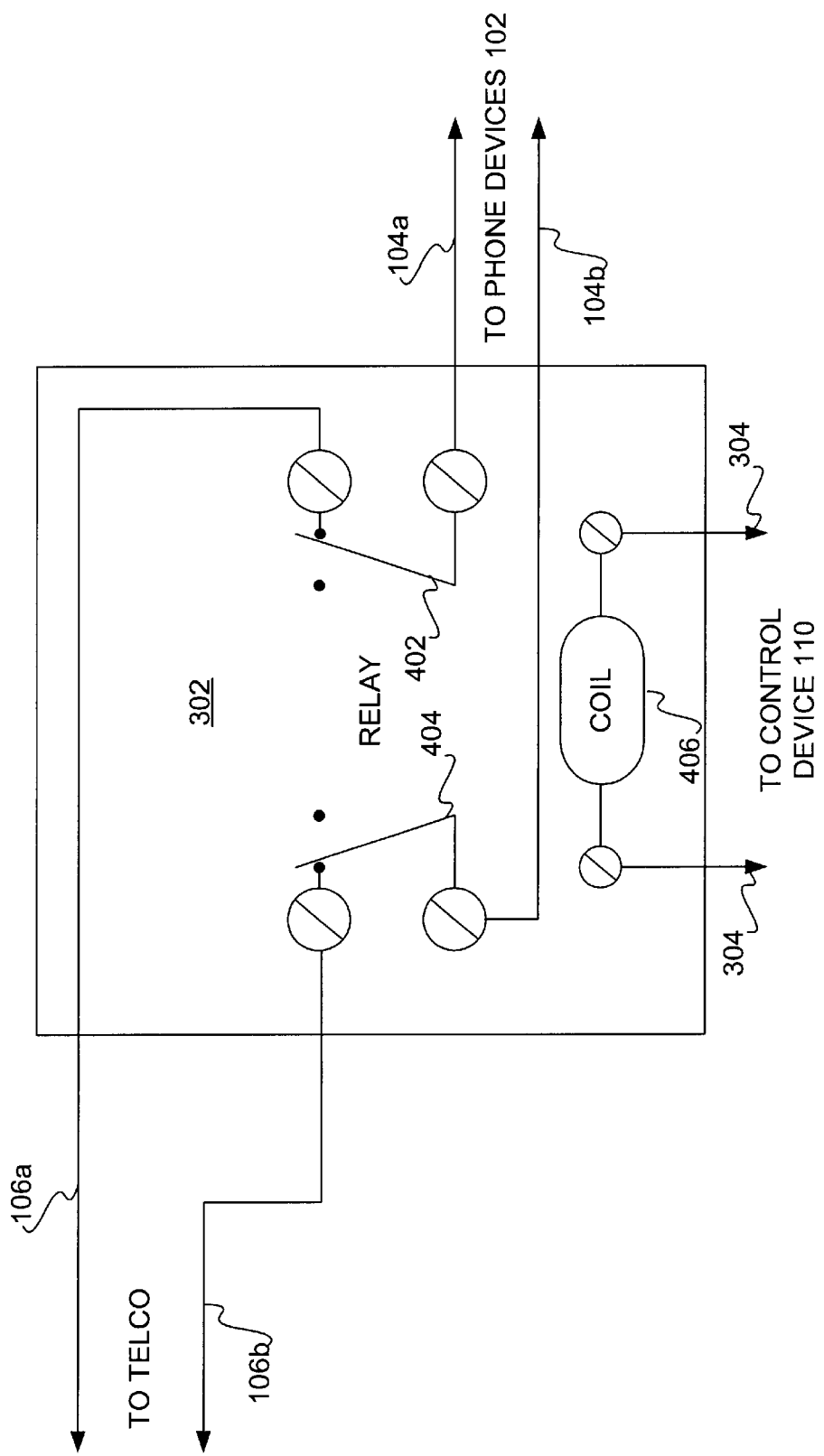
FIG. 4 is a diagram showing how the relay of FIG. 3 is connected to the incoming phone line, the common phone line wiring, and a control device.

FIG. 4 is a diagram showing in more detail how the relay 302 connects to the common phone line wiring 104, to the incoming phone line 106, and to the control line 304. The line wiring 104 is specifically made up of the ring line 104a and the tip line 104b, whereas the phone line 106 is specifically made up of the ring line 106a and the tip line 106b. The relay 302 is shown in FIG. 4 in an unexcited state, where the control line 304 is not being asserted by the control device 110. A switch 402 normally connects the ring line 104a of the line wiring 104 to the ring line 106a of the phone line 106. Similarly, a switch 404 normally connects the tip line 104b of the line wiring 104 to the tip line 106b of the phone line 106.

However, when the control line 304 is asserted, or excited, by the control device 110, this causes the coil 406 to emit an electromagnetic field, which moves the switches 402 and 404 left and right, respectively. In this excited state, the relay 302 disconnects the ring line 104a of the common phone line wiring 104 from the ring line 106a of the incoming phone line 106, and the tip line 104b of the line wiring 104 from the ring line 106b of the phone line 106. In this way, the common phone line wiring 104 is disconnected from the incoming phone line 106, such that the control device 110 has seized the common phone line wiring 104.

Figure 5:
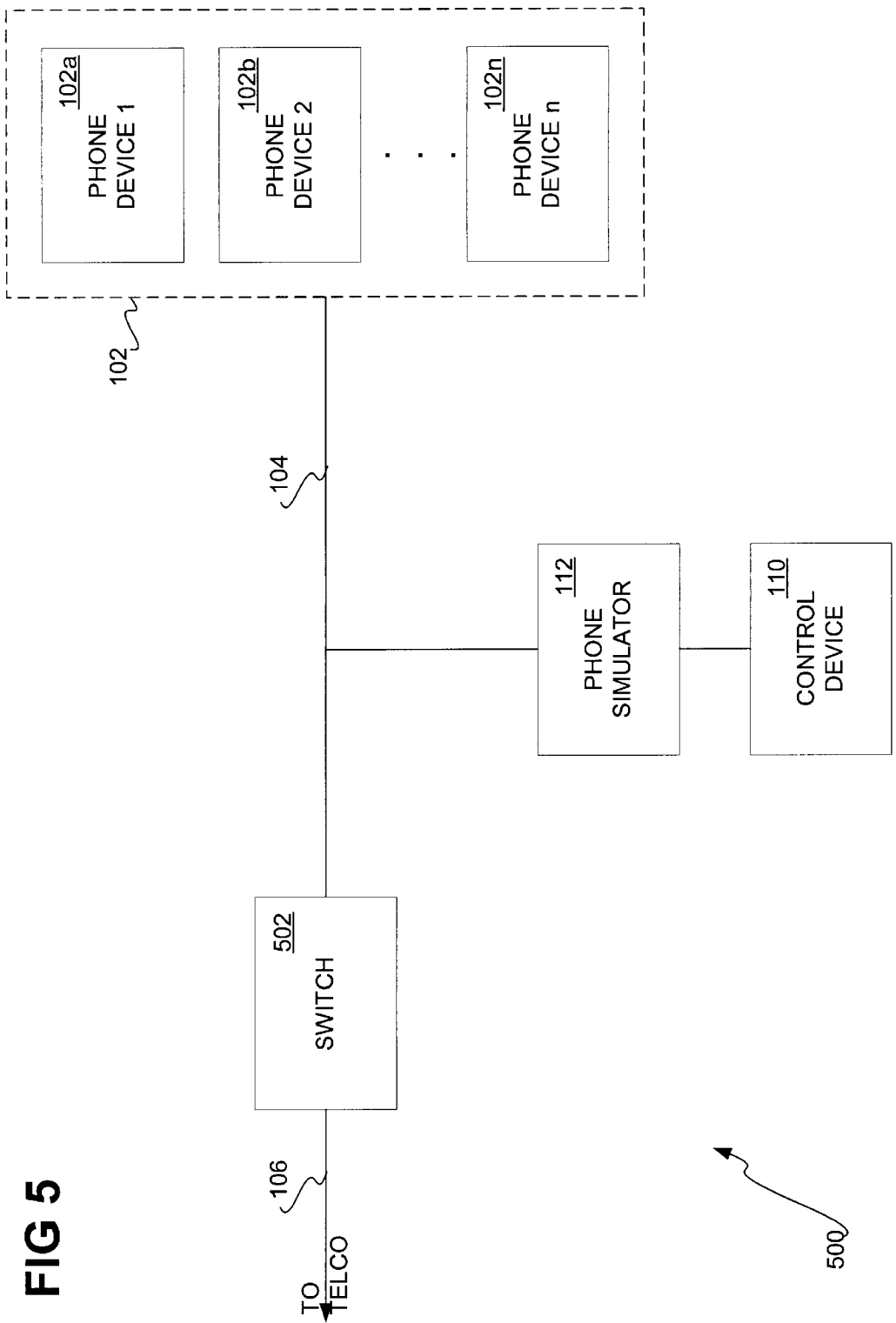
FIG. 5 is a diagram of a system having a manually actuated switch to allow seizure of common phone line wiring from an incoming phone line, according to one embodiment of the invention.

FIG. 5 is a diagram of a system 500 according to another embodiment of the invention. The system 500 varies from the system 300 of FIG. 3 in that a manually actuated switch 502 has replaced the relay 302, and there is no control line 304. The switch 302 is such that in a first position it allows connection of the common phone line wiring 104 to the incoming phone line 106. However, when the switch 502 is manually actuated by the user to a second position, the incoming phone line 106 is disconnected from the line wiring 104, such that the control device 110 has at least temporary exclusive control over the common phone line wiring 104. That is, the switch 502 allows for seizure of the common phone line wiring 104.

The system 500 of FIG. 5 works as follows. As before, the user enters in directory entries that he or she wishes to add to the directory storages of the phone devices 102 at the control device 110. The control device 110 then preferably instructs the user to actuate the switch 502 to the second position to disconnect the incoming phone line 106 from the common phone line wiring 104. Once the user has confirmed this actuation, the control device 110 simulates the phone calls corresponding to the directory entries, through the phone simulator 112, to the phone devices 102. Each phone call has caller ID information reflecting a corresponding directory entry. Once all the phone calls have been simulated, the control device 110 preferably instructs the user to actuate the switch 502 back to the first position to again connect the incoming phone line 106 to the common phone line wiring 104.

Therefore, as before, after the phone calls have been simulated by the control device 110 through the phone simulator 112 to the phone devices 102, each of the phone devices 102 has a caller log of the caller ID information of each of the phone calls simulated. The caller log of each of the phone devices 102 includes caller ID information for all the directory entries previously entered by the user at the control device 110. The user simply transfers the contents of the caller log of each of the phone devices 102 to the directory storage of the phone device. In this way, the system 500 enables the user to add desired directory entries to the directory storages of the phone devices 102.

Figure 6:
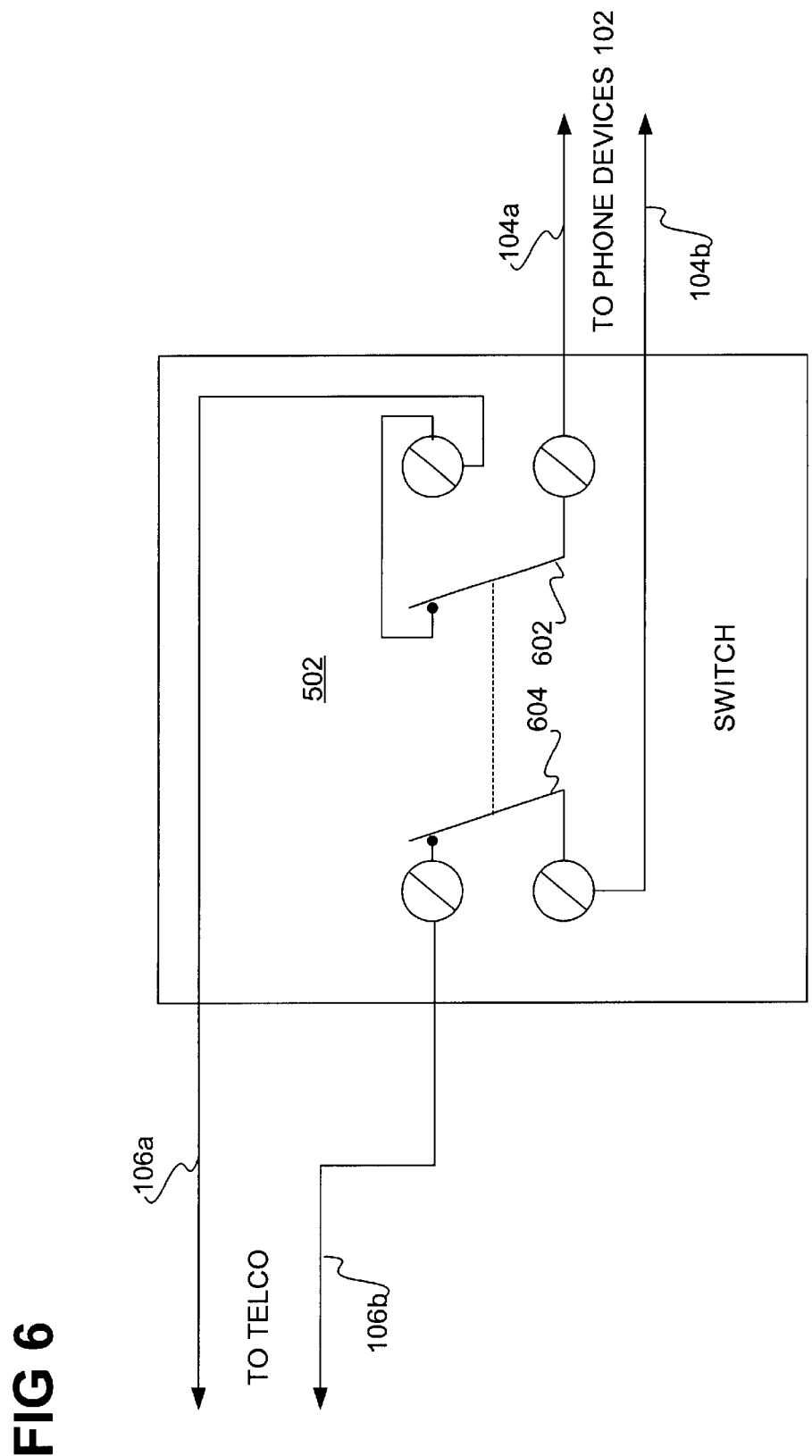
FIG. 6 is a diagram showing how the switch of FIG. 5 is connected to the incoming phone line and to the common phone line wiring.

FIG. 6 is a diagram showing in more detail how the switch 502 connects between the common phone line wiring 104 and the incoming phone line 106. The line wiring 104 is specifically made up of the ring line 104a and the tip line 104b, whereas the phone line 106 is specifically made up of the ring line 106a and the tip line 106b. The switch 502 is shown in FIG. 5 in the first position, where the common phone line wiring 104 is connected to the incoming phone line 106. A sub-switch 602 normally connects the ring line 104a of the line wiring 104 to the ring line 106a of the phone line 106. Similarly, a sub-switch 604 normally connects the tip line 104b of the line wiring 104 to the tip line 106b of the phone line 106.

However, when the switch 502 is moved to the second position, this causes the sub-switches 602 and 604 to move to the right. In the second position, the switch 502 disconnects the ring line 104a of the common phone line wiring 104 from the ring line 106a of the incoming phone line 106, and the tip line 104b of the line wiring 104 from the ring line 106b of the phone line 106. In this way, the common phone line wiring 104 is disconnected from the incoming phone line 106, such that the common phone line wiring 104 has been seized.

Figure 7:
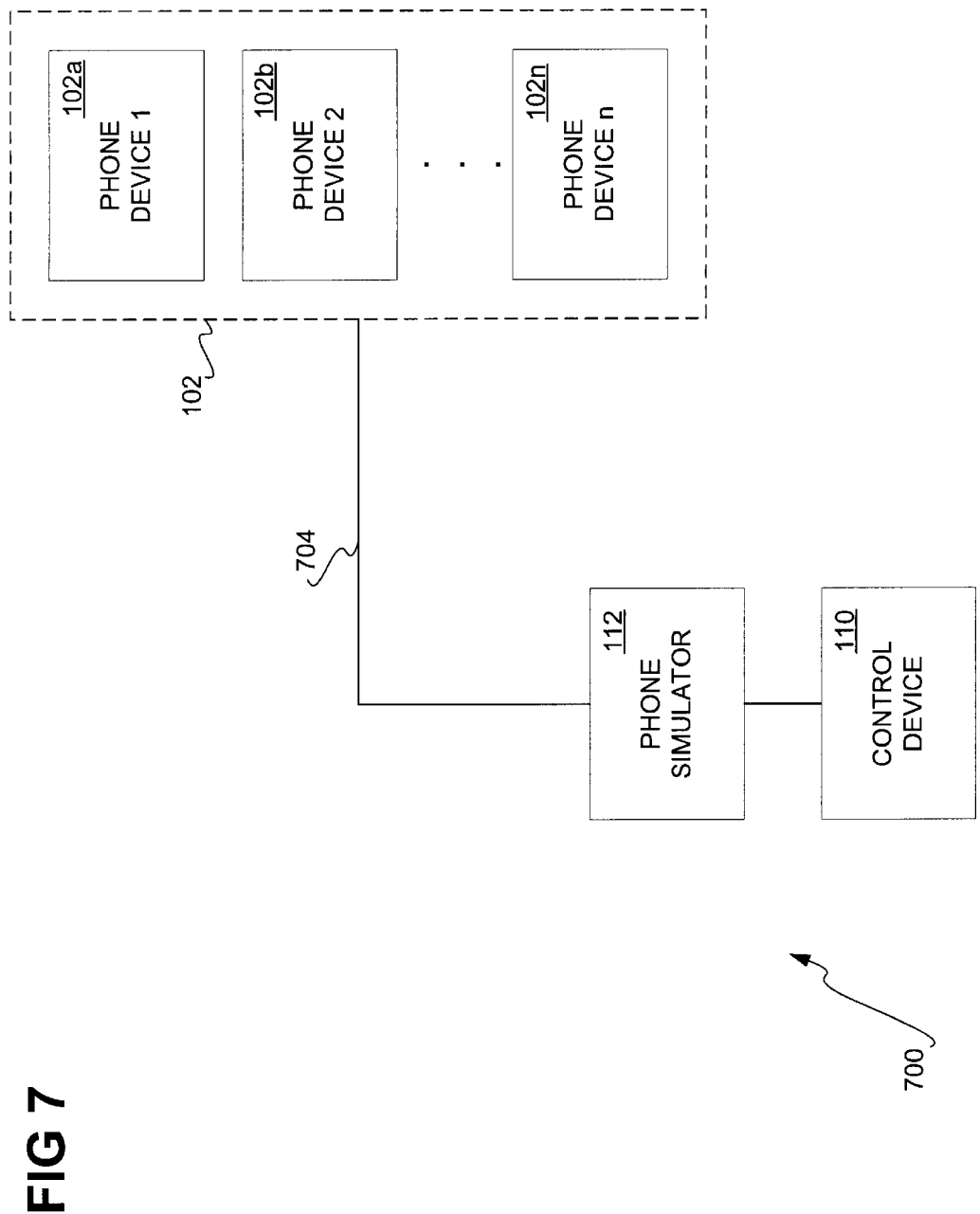
FIG. 7 is a diagram of a system without connection to an incoming phone line, according to one embodiment of the invention.

FIG. 7 is a diagram of a system 700 according to another embodiment of the invention. The system 700 varies from the system 100 of FIG. 1, the system 300 of FIG. 3, and the system 500 of FIG. 5 in that there is no incoming phone line 106, and no RJ31X jack 108, relay 302, or switch 502. The phone simulator 112 connects to the phone devices 102 through a line 704. The line 704 may be the common phone line wiring 104 previously described, or may be another type of line 704. Operation of the system 700 differs from the previously described systems primarily in that it does not require the seizure of common phone line wiring 104 to simulate phone calls to the phone devices 102. That is, the simulator 112 inherently has, or asserts, exclusive control of the line 704.

Therefore, the system 700 of FIG. 7 works as follows. As before, the user enters in directory entries at the control device 110. The control device 110 simulates the phone calls corresponding to the directory entries, through the phone simulator 112, to the phone devices 102. Each phone call has caller ID information reflecting a corresponding directory entry. After the phone calls have been simulated, each of the phone devices 102 has a caller log of the caller ID information of each of the phone calls simulated. The caller log of each of the phone devices 102 includes caller ID information for all the directory entries previously entered by the user at the control device 110. The user simply transfers the contents of the caller log of each of the phone devices 102 to the directory storage of the phone device. In this way, the system 700 enables the user to add desired directory entries to the directory storages of the phone devices 102.

FIG. 8 is a diagram of a system 800 according to another embodiment of the invention. The system 800 allows for the transfer of directory entries from a remote control device 802, over a network 804, to the control device 110. Once the directory entries are transferred to the control device 110, the system 800 operates as before. That is, as indicated by the part 806 of the system 800 that lies to the right of the dotted line 808, the control device 110 can operate as has been previously been described in conjunction with the embodiments of FIGS. 1–2, 3–4, 5–6, and 7.

The remote control device 802 can be a computer or another type of device. The user enters in the desired directory entries into the control device 802. The control device 802 sends these entries to the control device 110 over the network 804. The network 804 may be one or more of the Internet, an intranet, an extranet, a local-area network (LAN), a wide-area network (WAN), a wired network, a wireless network, or another type of network. Once the control device 110 has received the directory entries from the control device 802, it programs the phone devices 102 (not shown in FIG. 8), per one of the embodiments of FIGS. 1–2, 3–4, 5–6, and 7.

That is, the control device 110 simulates the phone calls corresponding to the directory entries to the phone devices 102. Each phone call has caller ID information reflecting a corresponding directory entry. After the phone calls have been simulated, each of the phone devices 102 has a caller log of the caller ID information of each of the phone calls simulated. The caller log of each of the phone devices 102 includes caller ID information for all the directory entries previously entered by the user at the control device 110. The user simply transfers the contents of the caller log of each of the phone devices 102 to the directory storage of the phone device. In this way, the system 800 enables the user to add desired directory entries to the directory storages of the phone devices 102.

FIG. 9 is a diagram of a system 900 according to another embodiment of the invention. The system 900 preferably needs the assistance of the local telephone company to be performed. The system 900 allows for the transfer of directory entries from the control device 110 to the local telephone company 902, over the line 904. The local telephone company 902 then simulates phone calls corresponding to the directory entries over the lines 906, such as by a control device and/or a phone simulator of the telephone company 902 (not shown in FIG. 9). The lines 906 include the lines 906a, 906b, . . . , 906, and connect to the phone devices 102a, 102b, . . . , 102n, respectively. That is, the local telephone company 902 simulates the phone calls, instead of the control device 110 simulating the phone calls through the phone simulator 112 (not shown in FIG. 9). For example, the local telephone company may offer the simulation of phone calls as a free or paid-for service to its subscribers or other users, as a way for the subscribers to add directory entries to all of their phone devices. An entity other than the local telephone company 902 may also perform the functionality of the telephone company 902.

The line 904 over which the control device 110 sends the directory entries to the local telephone company 902 may be one or more of an incoming phone line, such as the incoming phone line 106, common phone line wiring, such as the common phone line wiring 104, and a network. For example, the control device 110 may be a computer at which the user enters the desired directory entries, where the control device 110 then sends the directory entries over the Internet to the telephone company 902. As another example, the control device 110 may be a telephone or other phone device, where the user calls a phone number connected to a system at the local telephone company 902. The system prompts the user to enter the desired directory entries, by name and/or phone number, using the number keys of the telephone.

Once the user has entered in the desired directory entries at the control device 110, and they have been transferred over the line 904 to the local telephone company 902, the system 900 operates as follows. The local telephone company 902 simulates phone calls corresponding to the directory entries to the phone devices 102 over the lines 906. The lines 906 can include incoming phone lines, such as the incoming phone line 106, common phone line wiring, such as the common phone line wiring 104, or other types of lines. These other types of lines may include wireless lines where a corresponding device of the phone devices 102 is a cellular or other type of wireless phone.

For security reasons, the telephone company 902 may only allow the user of the control device 110 to simulate phone calls to phone devices that have phone numbers registered under his or her name. For example, the phone device 102a may be a cellular phone belonging to the user, the phone device 102b may be a phone connected to the user's primary incoming line, and the phone device 102n may be a phone connected to the user's secondary incoming line. In addition, or alternatively, the telephone company 902 may only allow the user of the control device 110 to simulate calls to phone devices that have phone numbers registered under the names of people who have given prior permission to receive simulated calls on behalf of the user. For example, the phone device 102a may be a cellular phone belonging to a friend of the user, the phone device 102b may be a phone connected to the incoming line of a sibling of the user, and so on.

As before, each simulated phone call has caller ID information reflecting a corresponding directory entry. After the phone calls have been simulated to the phone devices 102, each of them has a caller log of the caller ID information of each of the phone calls simulated. The caller log of each of the phone devices 102 includes caller ID information for all the directory entries previously entered by the user at the control device 110. The contents of the caller log of each of the phone devices 102 are transferred to the directory storage of the phone device. In this way, the system 900 enables the user to add desired directory entries to the directory storages of the phone devices 102.

Caller ID Information Format

FIGS. 10A, 10B, 10C, and 10D show the format by which the caller ID information can be transmitted when a phone call is simulated by the phone simulator 112. The format shown in FIGS. 10A–10D is particular to that used in at least the United States and Canada. Other caller ID information formats, however, are amenable to embodiments of the invention. The phone simulator 112 simulates a phone call as directed by the control device 110. For example, the simulator 112 may first simulate a dial tone, and then the rings of the phone call. The caller ID information is typically transmitted between at least some of the rings.

Figure 10A:
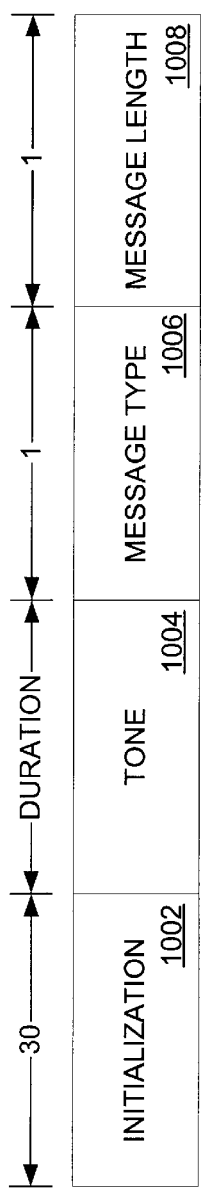
FIGS. 10A, 10B, 10C, and 10D are diagrams showing the format by which caller ID information is sent by telephone companies located at least in the United States and Canada.

As shown in FIG. 10A, formatting the caller ID information begins with an initialization string 1002. The initialization string 1002 is thirty words in length, and is typically thirty capital letters U, or 0×55 hex, in succession. Each word, or byte, is eight bits in length. Next, there is a tone 1004 for a duration of time. The tone 1004 is typically 130 milliseconds of a 1200 Hz tone, which is the Bell 202 mark frequency. The message type word 1006 follows. The word 1006 is 0×04 hex for caller ID that only transmits the phone number of the caller, and is 0×07 hex for caller ID that transmits both the number and name of the caller. Next, the message length word 1008 specifies the length, in bytes, of the subsequent date, time, and phone number part of the caller ID information, the format of which is shown in FIG. 10B.

Figure 10B:
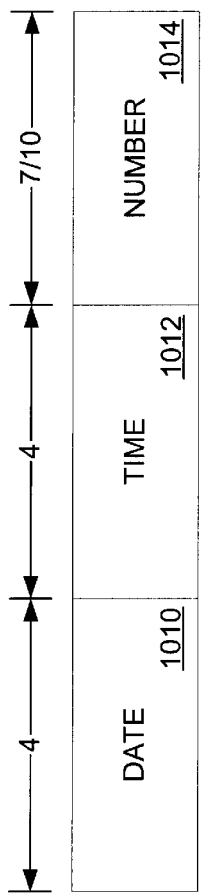

In FIG. 10B, the caller ID information formatting continues with a date string 1010 that is four bytes in length. The date string 1010 specifies the date of the call, in month and day, in ASCII format. For example, if the date string 1010 is "0324," this specifies that the date of the call is March 24. The time string 1012 that follows specifies the time of the call, with the hours and minutes in military format, and also in ASCII format. For example, if the time string 1012 is "1512," this specifies that the time of the call is 3:12 pm. The number string 1014 is either the seven or ten digits of the phone number, in ASCII format. If the number string 1014 is seven bytes in length, then it does not include the area code, whereas if the string 1014 is ten bytes in length, then it includes the area code. For example, if the number string 1014 is "5551212," this corresponds to the phone number 555-1212, without area code, whereas if the number string 1014 is "2085551212," this corresponds to the phone number (208) 555-1212.

Figure 10C:
Figure 10D:
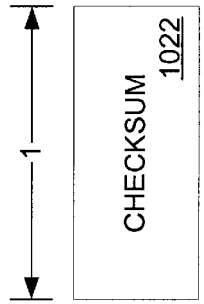

If the caller ID information includes only the phone number of the caller, then the formatting skips to FIG. 10D. However, if the caller ID information also includes the name of the caller, then the formatting continues according to FIG. 10C. In FIG. 10C, a delimiter word 1016, of one byte in length, is specified to separate the phone number formatting of FIG. 10B from the caller name formatting of FIG. 10C. The delimiter word 1016 is typically 0×01 hex. The following message length word 1018 indicates the number of bytes of the name of the caller that follows. The name string 1020 is next, and specifies the name of the caller, in ASCII, having a length equal to the number of bytes specified by the message length word 1018. For example, if the name string 1020 is "CARL JOHNSON," then this specifies the name of the caller is Carl Johnson, and the length word 1018 would be 12, to specify that there are two characters in the string "CARL JOHNSON."

Finally, either from FIG. 10B, where only the number of the caller is specified, or from FIG. 10C, where both the name and the number of the caller is specified, the caller ID information formatting ends with FIG. 10D. The checksum byte 1022 is computed by adding the values of all the previous bytes in the caller ID information, including those specified in FIGS. 10A and 10B, and also in FIG. 10C where the name of the caller is specified. This two's complement is taken of the low byte of this sum, the result being the checksum byte 1022. That is, the two's complement of the modulo-256 simple checksum of the previous bytes in the caller ID information is taken. The checksum byte 1022 is preferably used by the phone devices 102 to determine whether they correctly detected the caller ID information transmitted by the control device 110 through the phone simulator 112.

When a call originates from a phone number or an area that does not support caller ID, then a capital letter O, 0×4F hex, is transmitted as the phone number string 1014 instead of the actual number. Differing phone devices 102 may display such a transmission as "unknown," "anonymous," "unavailable," and so on. If the call is marked as private by the caller, then a capital letter P, 0×50 hex, is transmitted as the phone number string 1014 instead of the actual number. A caller may mark his or her phone call as private by using the *67 blocking feature available from some local telephone companies, or by using a permanent blocking service or device. Differing phone devices 102 may display such a transmission as "blocked," "private," and so on.

Method

Figure 11:
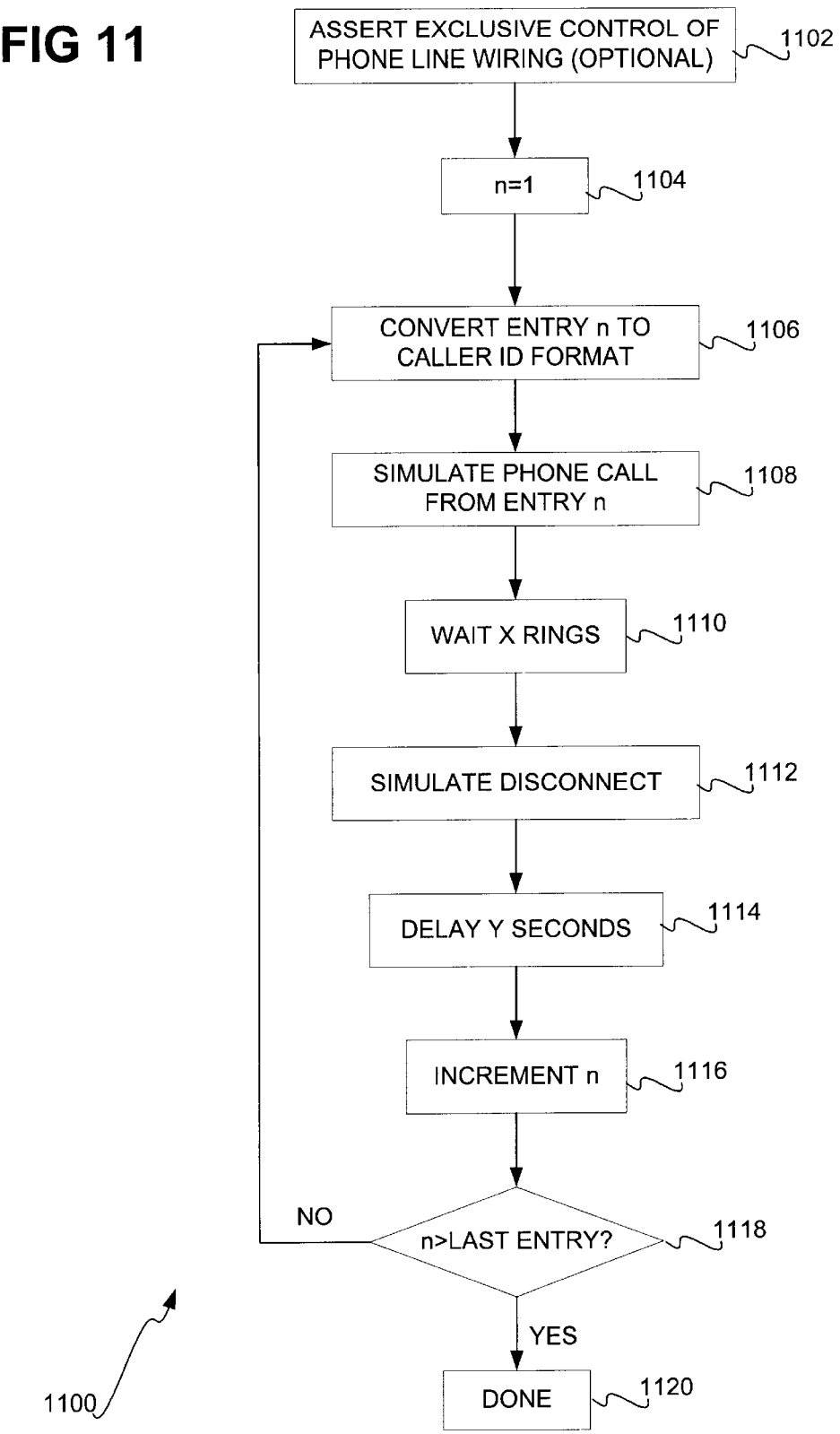
FIG. 11 is a diagram of a method according to an embodiment of the invention.

FIG. 11 is a flowchart of a method 1100 according to an embodiment of the invention. The method 1100 may be performed by the control device 110 and/or the phone simulator 112. The method 1100 may also be stored as instructions on a computer-readable medium, such as a memory of a device, a CD-ROM, and so on. The method 1100 may also be executed in conjunction with the embodiments of the invention described in FIGS. 1–2, 3–4, 5–6, and 7. The method 1100 may also be executed in conjunction with the embodiment of FIG. 8, after the control device 110 has received the directory entries from the remote control device 802. Furthermore, the method 1100 may be executed in conjunction with the embodiment of FIG. 9, after the control device 110 has sent the directory entries to the local telephone company 902.

At least temporary exclusive control of the phone line wiring 114 is first optionally asserted (1102). Exclusive control of the phone line wiring 114 seizes the phone line wiring 114 from the incoming phone line 116. Exclusive control is initially asserted particularly in the embodiments of FIGS. 3–4 and 5–6. In the former embodiment, the control device 110 excites the control line 304 connected to the relay 302 to seize the phone line wiring 114. In the latter embodiment, the control device 110 preferably instructs the user to manually actuate the switch 502 to seize the phone line wiring 114. Exclusive control is not initially asserted particularly in the embodiments of FIGS. 1–2 and 7. In the former embodiment, the RJ31X jack 118 is used to seize the phone line wiring 114 on a call-by-call basis, whereas in the latter embodiment, there is no incoming phone line 116 from which to seize the line 704, which may be the phone line wiring 114. The latter embodiment may also be described as having inherent seizure or exclusive control of the line 704.

A counter n is initialized to one (1104), and the first directory entry n is converted to caller ID format (1106), such as that of FIGS. 10A–10D as has been described. Each directory entry n includes a name and a phone number pair, such as a name and a phone number pair that has been previously entered in by the user at the control device 110, and that the user wishes to add to the directory storages of the phone devices 112. A phone call from the caller at the phone number of entry n is then simulated (1108). Simulation of the phone call may include simulating a dial tone, and then transmitting the caller ID information to which the entry n was previously converted. In the embodiment of FIGS. 1–2, simulation of the phone call may also entail automatic seizure of the phone line wiring 114, by virtue of the phone simulator 112 being connected to the RJ31X jack 118. That is, in this embodiment, seizure is automatic for the duration of simulating the call.

A number of rings x is next simulated (1110), and after waiting for these rings to be simulated, disconnection of the phone call, or hang up, is simulated (1112). The caller ID information can be transmitted between one or more of the rings that have been simulated. In the embodiment of FIGS. 1–2, simulation of the disconnection of the call may also include automatic release of the phone line wiring 114, again by virtue of the simulator 112 being connected to the RJ31X jack 118. Preferably, there is a delay of a number of seconds (1114), and then the counter n is incremented (1116). If n has not yet exceeded the total number of directory entries for which phone calls are to be simulated (1118), then the process described is repeated (1106, 1108, 1110, 1112, 1114, and 1116). Otherwise, if n has exceeded the total number of directory entries for which phone calls are to be simulated (1118), then the method 1100 is finished (1120).

After the phone calls have been simulated, each of the phone devices 112 has a caller log of the caller ID information of each of the simulated phone calls. The caller log of each of the phone devices 112 includes caller ID information for all the directory entries for which phone calls have been simulated. The user can then transfer the contents of the caller log of each of the phone devices 112 to the directory storage of the phone device.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A system for adding a plurality of directory entries to a directory storage of each of one or more phone devices coupled to common phone line wiring and having caller ID and caller log capabilities, the system comprising:

a phone simulator capable of simulating phone calls with caller ID information on the common phone line wiring to the one or more phone devices; and, a control device to simulate a plurality of phone calls corresponding to the plurality of directory entries through the phone simulator to the one or more phone devices, each phone call having caller ID information reflecting a corresponding directory entry, such that after simulation of the plurality of phone calls by the control device each of the one or more phone devices has a caller log of the caller ID information of each phone call simulated for transfer into the directory storage thereof.

2. The system of claim 1, wherein the phone simulator is part of the control device itself.

3. The system of claim 1, wherein the common phone line wiring is without connection to a phone line.

4. The system of claim 1, wherein the common phone line wiring normally allows the one or more phone devices to make phone calls on a phone line, the system further comprising an RJ31X jack coupled between the phone line and the common phone line wiring, the phone simulator coupled to the RJ31X jack such that the phone simulator seizes the common phone line wiring when simulating the phone calls to the one or more phone devices.

5. The system of claim 1, wherein the common phone line wiring normally allows the one or more phone devices to make phone calls on a phone line, the system further comprising a relay coupled between the phone line and the common phone line wiring, the control device coupled to the relay such that the control device excites the relay to seize the common phone line wiring when simulating the plurality of phone calls through the phone simulator to the one or more phone devices.

6. The system of claim 1, wherein the common phone line wiring normally allows the one or more phone devices to make phone calls on a phone line, the system further comprising a manually actuated switch coupled between the phone line and the common phone line wiring to manually seize the phone line wiring prior to the control device simulating the plurality of phone calls through the phone simulator to the one or more phone devices.

7. The system of claim 1, further comprising a remote control device at which the plurality of directory entries are entered, and that sends the plurality of directory entries over a network to the control device for simulation to the one or more phone devices.

8. The system of claim 1, wherein the phone simulator and the control device are located at an entity, such that simulation of the plurality of phone calls is performed as a service by the entity to users of the entity.

9. A computer-readable medium having instructions stored thereon to cause performance of a method comprising, for each of a plurality of directory entries:

converting the directory entry to caller ID information reflecting the directory entry; and, simulating a phone call having the caller ID information reflecting the directory entry to one or more phone devices having caller ID, caller log, and directory storage capabilities, such that, after simulation of the phone call for each of the plurality of directory entries, each of the one or more phone devices has a caller log of the caller ID information of the phone call simulated for each of the plurality of directory entries for transfer into a directory storage thereof.

10. The medium of claim 9, the method further comprising, for each of the plurality of directory entries, delaying a length of time.

11. The medium of claim 9, wherein simulating the phone call for each of the plurality of directory entries comprises initially seizing common phone line wiring to which each of the one or more phone devices is coupled and which normally allows the one or more phone devices to make phone calls on a phone line.

12. The medium of claim 9, the method further comprising, prior to, for each of the plurality of directory entries, converting the directory entry and simulating the phone call:

seizing common phone line wiring to which each of the one or more phone devices is coupled and which normally allows the one or more phone devices to make phone calls on a phone line, by exciting a relay coupled between the phone line and the common phone line wiring.

13. The medium of claim 9, the method further comprising, prior to, for each of the plurality of directory entries, converting the directory entry and simulating the phone call:

seizing common phone line wiring to which each of the one or more phone devices is coupled and which normally allows the one or more phone devices to make phone calls on a phone line, by instructing a user to manually actuate a switch coupled between the phone line and the common phone line wiring.

14. The medium of claim 9, wherein the method is performed as a service offered by an entity to users of the entity.

15. A method for adding a plurality of directory entries to a directory storage of each of one or more phone devices coupled to common phone line wiring and having caller ID and caller log capabilities, the method comprising:

asserting at least temporary exclusive control of the common phone wiring; and, simulating a plurality of phone calls corresponding to the plurality of directory entries to the one or more phone devices over the common phone line wiring, each phone call having caller ID information reflecting a corresponding directory entry, such that after simulation of the plurality of phone calls each of the one or more phone devices has a caller log of the caller ID information of each phone call simulated for transfer into the directory storage thereof.

16. The method of claim 15, wherein asserting the at least temporary exclusive control of the common phone line wiring comprises inherently asserting indefinite exclusive control of the common phone line wiring.

17. The method of claim 15, wherein asserting the at least temporary exclusive control of the common phone line wiring comprises automatically asserting exclusive control of the common phone line wiring for a simulation duration of each of the plurality of phone calls.

18. The method of claim 15, wherein simulating the plurality of phone calls corresponding to the plurality of directory entries to the one or more phone devices comprises simulating each of the plurality of phone calls through an RJ31X jack coupled between the common phone line wiring and a phone line on which the one or more phone devices normally make phone calls.

19. The method of claim 15, wherein asserting the at least temporary exclusive control of the common phone line wiring comprises exciting a relay coupled between the common phone line wiring and a phone line on which the one or more phone devices normally make phone calls.

20. The method of claim 15, wherein asserting the at least temporary exclusive control of the common phone line wiring comprises instructing a user to manually actuate a switch coupled between the common phone line wiring and a phone line on which the one or more phone devices normally make phone calls.

* * * * *